United States Patent [19]

Mills

[11] Patent Number: 4,677,281
[45] Date of Patent: Jun. 30, 1987

[54] ELECTRIC HEATING APPARATUS WITH INTEGRATED SOLID STATE COMFORT CONTROL AND OVERHEAT PROTECTION

[75] Inventor: Edwin R. Mills, Raleigh, N.C.

[73] Assignee: Fieldcrest Cannon, Inc., Eden, N.C.

[21] Appl. No.: 927,264

[22] Filed: Nov. 4, 1986

[51] Int. Cl.⁴ .............................................. H05B 1/02
[52] U.S. Cl. .................................. 219/505; 219/501; 219/212; 361/190; 361/100; 361/87
[58] Field of Search ............... 219/212, 504, 505, 497, 219/494, 501, 507, 508, 506, 549, 528; 361/188, 190, 87, 100, 124, 189; 307/231

[56] References Cited

U.S. PATENT DOCUMENTS 3,222,497 12/1965 Gordon, Jr. ........................ 219/212
3,588,446 6/1971 Mills ................................... 219/212
4,315,141 2/1982 Mills et al. ........................ 219/212
4,430,560 2/1984 Mills et al. ........................ 219/505
4,549,074 10/1985 Matsuo ............................. 219/505
4,607,154 8/1986 Mills .................................. 219/212

Primary Examiner—M. H. Paschall
Attorney, Agent, or Firm—Bell, Seltzer, Park & Gibson

[57] ABSTRACT

A heated bedcover containing an electrical heating element therein is provided with an integrated solid state control circuit which functions providing control over the heating element both for comfort control so as to maintain a desired heat output from the heating element and to also provide protection against overheating conditions in the blanket.

5 Claims, 3 Drawing Figures

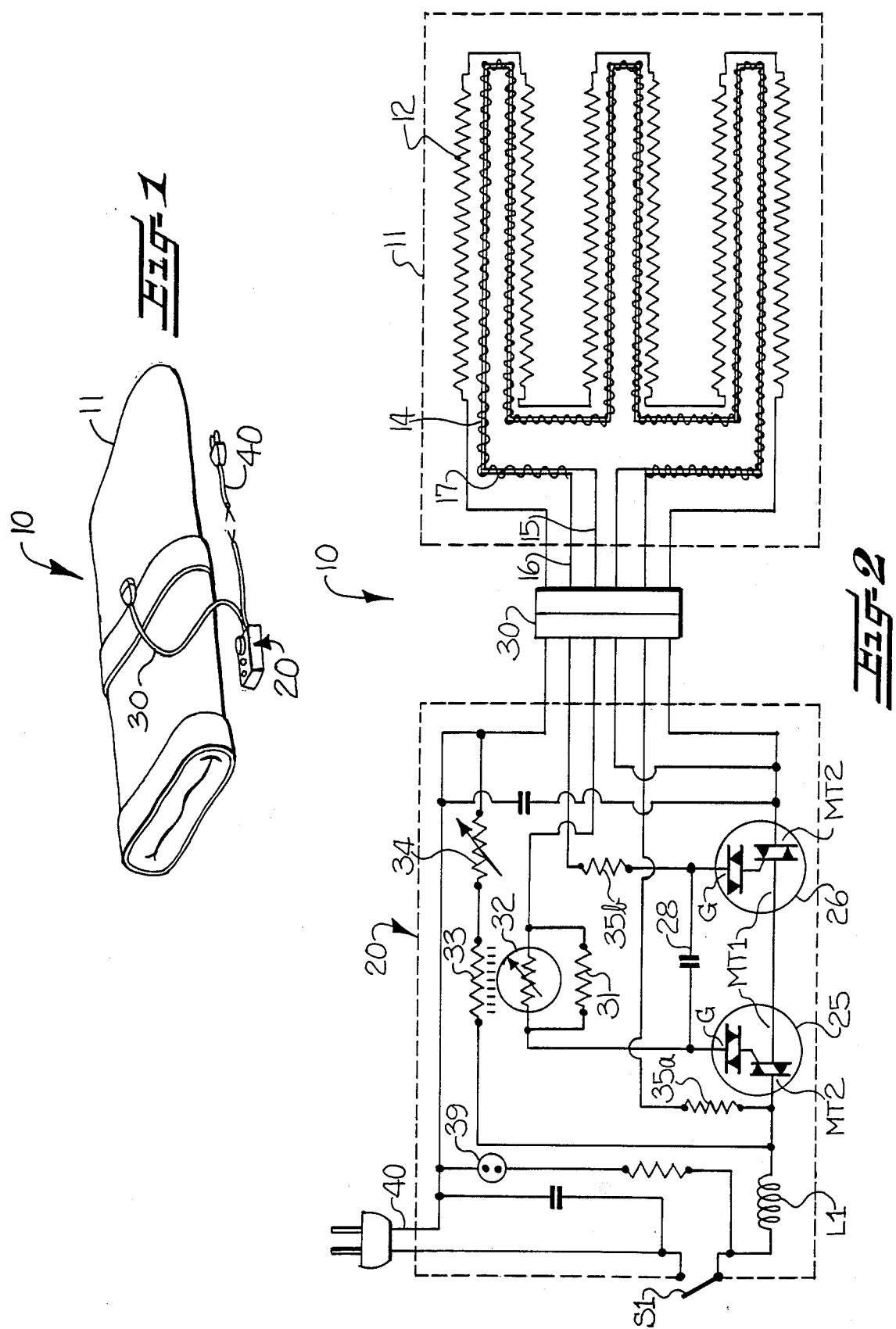

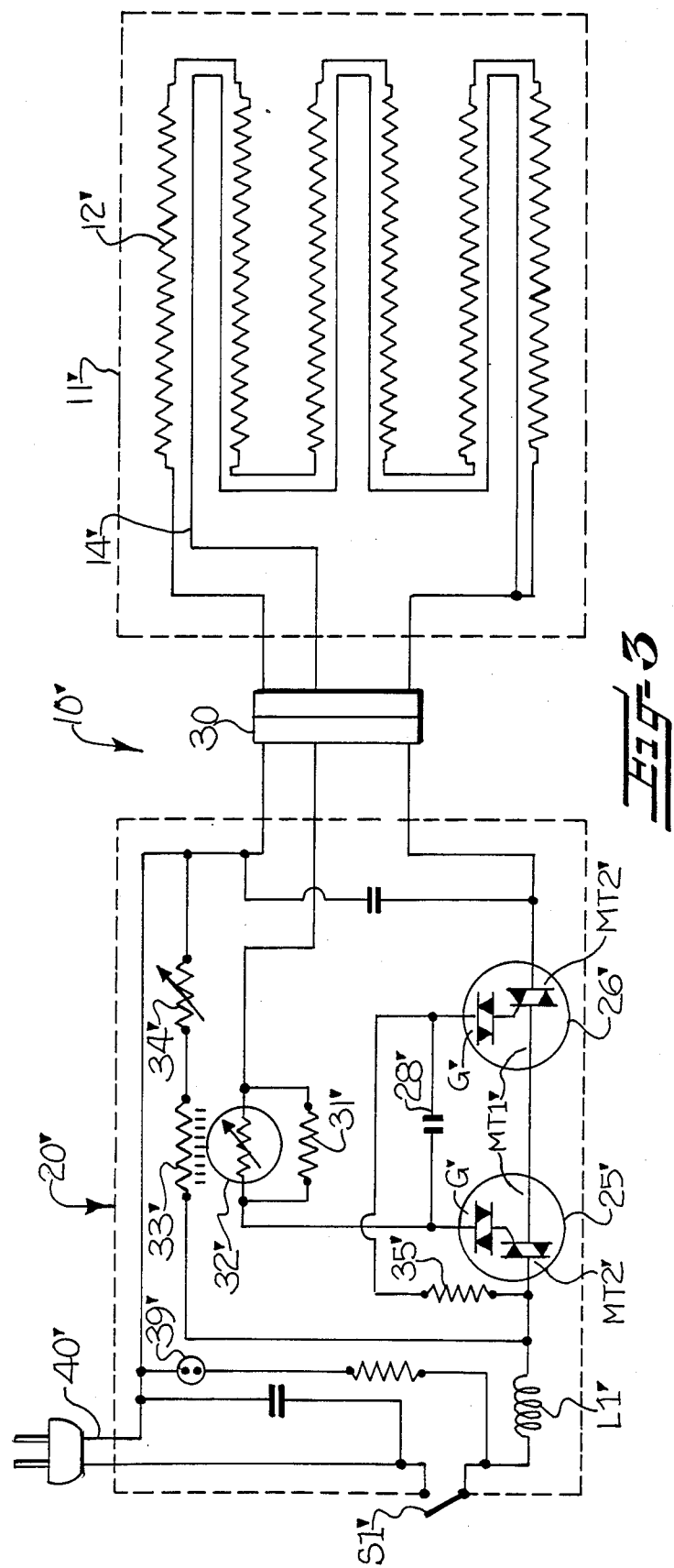

ELECTRIC HEATING APPARATUS WITH INTEGRATED SOLID STATE COMFORT CONTROL AND OVERHEAT PROTECTION

FIELD AND BACKGROUND OF THE INVENTION

Electrical heating appliances in the form of bedcovers, such as electric blankets, are popular with consumers and have represented a commercially significant area of development. Electric bedcovers are conventionally provided with a comfort control to enable the user to regulate the temperature of the bedcover at a desired level with respect to the ambient temperature. Additionally, for purposes of safety the electric bedcover is provided with an overheat control for protection against an overheating condition in the bedcover.

In conventional commercial practice, the comfort temperature of the bedcover is commonly regulated by cycling the application of voltage to the heating element during the time that the bedcover is in use. Typically, such off-on cycling of the heating element has been controlled by an ambient responsive bimetallic thermostatic switch connected in series with the heating element. However, the use of a bimetallic switch is objectionable in that it is somewhat noisy in operation and it produces a cycling, non-uniform heat output. To overcome these disadvantages, "solid state" comfort control circuits have been proposed which employ a semiconductor device in place of the bimetallic thermostatic switch. For example, a circuit employing a semiconductor device for modulating the power delivered to a heating element is disclosed in U.S. Pat. No. 3,588,446.

Many arrangements for protecting against an overheating condition in the blanket are known from previous work and at least some such arrangements have achieved significant commercial success. For example, one common approach has employed bimetallic thermostatic switches disposed throughout the heated area of the blanket, with the bimetallic switches serving to interrupt the flow of current to the heating elements when an overheating condition is detected. However, the bimetallic switches are discretely located and, thus, have limited areas of protection; and, in addition form lumps throughout the heated area of the bedcover, which is aesthetically undesirable.

An overheating protection circuit for an electric blanket is disclosed in U.S. Pat. No. 4,315,141 which overcomes the aforementioned disadvantages by employing in the heated area of the blanket a sensor wire having temperature sensitive impedence characteristics. The sensor wire is connected to a pair of gate controlled bidirectional semiconductor switches (also known as "Quadracs") so as to control triggering of the semiconductor switches from a conductive to a non-conductive state in response to the sensing of an overheat condition, and thereby to reduce or interrupt the electrical power provided to the heating element. The unique arrangement of the pair of semiconductor switches as disclosed in U.S. Pat. No. 4,315,141 has the further safety advantage of providing a fail-safe circuit which insures that, in the event of failure of any one of the circuit components in the shorted or closed state, the current flow to the heating elements will be interrupted. This kind of fail-safe characteristic is a requirement for approval by certain certifying agencies.

The solid state semiconductor overheat protection circuit disclosed in U.S. Pat. No. 4,315,141 thus has a number of significant advantages over prior overheat circuits, as noted above. However, in achieving comfort control, the circuit illustrated and described in the aforementioned patent still relies upon a conventional bimetallic thermostatic switch, with the attendant disadvantages of noise and cycling as noted earlier. The patent does state that alternative comfort control circuits, such as the solid state comfort control circuit of U.S. Pat. No. 3,588,446 may be employed. However, the use of this solid state comfort control circuit together with the solid state overheat protection circuit of U.S. Pat. No. 4,315,141 has not been adopted for commercial practice, due primarily to the high cost of the separate solid state electrical components required to provide both of these functions.

With the foregoing in mind, it is a primary object of the present invention to provide an improved control circuit for an electrical heating apparatus such as an electric blanket, which provides both ambient sensitive solid state comfort control and solid state overheat protection.

It is a further and more specific object of the present invention to provide a control circuit of the type described wherein both of these functions are accomplished by the same solid state devices so as to thereby significantly reduce the electrical component costs.

It is still another object of the invention to provide an integrated solid state comfort and overheat control circuit which has fail-safe properties in the event of electrical component failure.

SUMMARY OF THE INVENTION

These and other objects and advantages of the present invention are achieved by the electrical circuit hereinafter more fully described, which employs a pair of bidirectional gate controlled semiconductor switches connected to one another in "front-to-front" orientation and connected both to a comfort control sensor and to an overheat sensor.

The electrical heating apparatus of the present invention comprises a bedcover; electrical heating means in the bedcover for generating heat upon flow of alternating electrical current therethrough; and control means associated with the electrical heating means and operable both for regulating the temperature of the bedcover at a level set by the user with respect to the ambient temperature and for providing protection against an overheating condition in the bedcover. The control means comprises:

(a) a pair of gate controlled bidirectional semiconductor switches electrically connected to one another in series and in front-to-front orientation and also connected in series with the electrical heating means for controlling the passage of portions of both half cycles of an alternating electrical current so as to modulate the power delivered to the electrical heating means in response to a low current gating signal whose phase can be varied in relation to the alternating electrical current applied to the pair of semiconductor switches;

(b) means capacitively coupling the gates of the pair of semiconductor switches to each other;

(c) means electrically interconnecting the gate of each one the semiconductor switches to the back of the other semiconductor switch;

(d) positive temperature coefficient resistance means for sensing changes in ambient temperature above and below a predetermined temperature which is set by a user for comfort, the positive temperature coefficient resistance means being electrically connected by said means (c) in series with the gate of one of the semiconductor switches and the back of the other to allow phase control modulation of the pair of semiconductor switches in response to changes in ambient temperature sensed by the positive temperature coefficient resistance means; and (e) temperature sensitive resistance means in the bedcover for sensing the occurrence of an overheating condition in the bedcover, the temperature sensitive resistance means being electrically connected with the gate of at least one of the pair of semiconductor switches for triggering the switches to a nonconductive state in response to a predetermined change in the resistance of the temperature sensitive resistance means in the bedcover resulting from the occurrence of an overheating condition so that the electrical current to the electrical heating means is interrupted.

BRIEF DESCRIPTION OF THE DRAWINGS

Some of the features and advantages of the invention having been stated, others will appear as the description proceeds, when taken in connection with the accompanying drawings, in which FIG. 1 is a perspective view of an electrical heating apparatus in accordance with the present invention, in the form of a bedcover and in particular an electric blanket;

FIG. 2 is a schematic diagram of one embodiment of a suitable integrated comfort control and overheat protection circuit for use in the blanket of FIG. 1; and FIG. 3 is a schematic diagram of a second embodiment of a suitable integrated comfort control and overheat protection circuit in accordance with the present invention.

DETAILED DESCRIPTION OF THE INVENTION

While the present invention will be described hereinafter with particular reference to the accompanying drawings, it is to be understood at the outset of this description that persons skilled in the applicable arts will be able to modify the specific arrangements here described and shown while continuing to achieve the desired result of this invention. Accordingly, the description and illustrations are to be taken as broad, teaching disclosures directed to persons skilled in the appropriate arts, and not as restricting the scope of the present invention.

As illustrated in FIG. 1, the electrically heated apparatus of the present invention preferably takes the form of a bedcover, in particular a blanket generally indicated at 10. A bedside control unit 20 is provided, connected with components within the bedcover 10 by an appropriate conductor cable 30 and with a source of electrical current through a power cord 40.

Referring now more particularly to FIG. 2, the bedcover 10 is there schematically illustrated as a textile blanket shell 11. An electrical resistance heating element 12 is disposed in and extends through channels formed in the blanket shell 11. As is known, the electrical heating element 12 generates heat upon flow of electrical current therethrough. The blanket additionally includes overheat detection means disposed throughout the heated area of the blanket for sensing the occurrence of an overheating condition of the heating element. In the embodiment illustrated in FIG. 2, the overheat detection means includes a temperature sensitive impedence means in the form of a sensor wire 14. The sensor wire 14 is positioned within the blanket shell 11 in close proximity to the electrical heating element 12 for sensing the occurrence of an overheating condition of the heating element. The sensor wire 14 is similar to that disclosed, for example, in Gordon U.S. Pat. No. 3,222,497. In particular, this sensor wire 14 comprises a pair of conductors 15,16 normally electrically separated from one another by a temperature sensitive dielectric material 17 having a negative temperature coefficient of resistance, whereby the resistivity of the material decreases as its temperature increases.

Within the control housing 20 is provided a circuit which cooperates with the sensor wire 14 for providing overheat protection by interrupting current flow to the heating element 12 when an overheating condition is detected. The same circuit in the control housing 20 also provides for comfort control of the blanket temperature. The electrical heating element 12 and the conductors 15, 16 of the sensor wire 14 are electrically connected to the control housing 20 through the cable 30.

Referring now in more detail to the control circuit, the control housing 20 contains a pair of gate controlled bidirectional semiconductor switches 25, 26 electrically connected to one another in series and controlling the conductance of electrical current through the heating element 12. The gate controlled bidirectional semiconductor switches 25, 26 are of the type which is sometimes referred to by the term "Quadrac" and are available from various manufacturers. The "Quadrac" is a bistable semiconductor device triggered through an integral diac and which can block voltage in either direction, conduct current in either direction, and be triggered for conducting current in either direction by the application of gate signals. The basic switch structure typically includes a terminal MT1 and an adjacent gate terminal G located on one side of the device, and a terminal MT2 on the opposite side. The region of the semiconductor between the terminals MT1 and MT2 is in the form of two parallel, oppositely connected SCR switches. The schematic symbol for such a portion is a pair of complementary triangular symbols. The gate terminal is indicated by a line eminating from the MT1 side of the schematic symbol and including, within the envelope of the device, complementary triangular symbols indicating the diac characteristics of the gate portion of the device. Terminal MT1 is the reference point for measurement of voltages and currents at the gate terminal G and at the opposite terminal MT2. The MT1 terminal side of the switch is often regarded as the "front" of the device and the MT2 terminal side of the Quadrac is regarded as the "back" of the device. For ease of understanding, this terminology is used in the present description and claims in order to specify the interconnection of the pair of switches 25, 26.

In particular, it will be noted that the pair of gate controlled bidirectional semiconductor switches 25, 26 provided in accordance with the present invention are electrically connected to one another in series and in front-to-front orientation. That is, the MT1 terminal sides of the devices are directly joined, with the MT2 terminal sides serving to connect the switches 25, 26 in series relation with the electrical resistance heating element 12 and the power cord 40.

In order to accomplish overheat protection in accordance with the FIG. 2 embodiment of the invention, means are provided which electrically connect the respective gates G of the switches 25, 26 to one another through the temperature sensitive resistance means or sensor wire 14. More specifically, it will be seen from FIG. 2 that the gate G of switch 25 is connected to the back of the other switch 26 through (i.e. in series with) one of the conductors 15 of the sensor wire 14, while the gate of switch 26 is connected to the back of the other switch 25 through (in series with) the other conductor, 16, of the sensor wire 14. A fixed resistance 35a or 35b may also be interposed in the circuits connecting the respective switches 25, 26. At normal blanket temperatures, the NTC material 17 between the conductors 15, 16 is an insulator, and thus each of the switches normally is triggered into a conductive state to permit conductance of alternating electrical current through the heating element 12. However, when an overheating condition occurs in the blanket, the elevated temperature causes the NTC material to become conductive, thus shorting out the gate signals to the switches 25, 26, and conductance of electrical current through the heating element 12 is thereupon interrupted.

In the event that either of the switches 25, 26 should fail in an open or non-conducting state, no current is conducted to the heating element 12. Should one switch fail in a shorted or conductive state, the other switch will enter a condition in which no current is conducted to the heating element 12, due to the front-to-front interconnection of the switches and the coupling of the gates of the switches 25, 26 directly to one another through a suitable capacitor 28. This result also follows from the "cross-over" connection of the gate circuits. That is, the gate G for one switch 26 is connected to the "back" terminal MT2 of the other switch.

In order to provide a means for a user of the blanket to controllably vary the degree of warmth obtained from the blanket, while also compensating for variations in ambient temperature, a positive temperature coefficient resistance varying means, in the form of a PTC resistor 32, is connected in series with the gate of one of the switches and the back of the other. Additionally, a padding resistor 31, which is incidental to the operation of the circuit, is connected in parallel with the PTC resistor 32. A resistor 33 is thermally coupled to the PTC resistor 32 and functions to bias the PTC resistor to provide the heat output desired by the user, whereby the positive temperature coefficient resistance device is also responsive to changes in ambient temperature, as well as to changes in the set point selected by the user. A user adjustable variable resistor 34 is also connected in series with the biasing resistor 33 to permit manual adjustment of the heat output of biasing resistor 33 and, thus, the desired comfort level. After the PTC resistor 32 has been biased by the user by appropriately setting the variable resistor 34, the resistance of the PTC resistor 32 will increase or decrease in response to changes in ambient room temperature.

The PTC resistor 32 and capacitor 28 form part of a resistance-capacitance timing circuit (R-C circuit) which generates a gating signal to the semiconductor switches 25, 26. As is known from basic alternating current circuit design, a capacitor in an R-C circuit is charged during each half cycle of alternating line current applied thereto, with the rise time of voltage appearing across the capacitor lagging behind the rise time of the impressed alternating line current to a degree or phase angle determined by the particular resistance-capacitance values present in the R-C circuit. By varying one or the other of the values, the particular rise time of the voltage across the capacitor may be controlled thus varying the phase relation of gating signals applied to the semiconductor switches and consequently varying the average power delivered to the heating element. Thus, changes in the resistance of the PTC resistor 32 will modulate the semiconductor switches 25, 26 to conduct less or more so as to maintain the blanket comfort level in accordance with changes in ambient temperature and the user setting of the variable resistor 34.

The semiconductor switches 25, 26 under certain conditions may give rise to voltage transients which may cause radio frequency interference. Recognizing the possibility that such interference may result from the use of the power control circuit of the present invention, it is preferred that the circuit include such resistance-capacitance and/or inductive components as are required to prevent undue interference with radio receiver devices in the area of use of the electrically heated bedcover. A series connected choke or inductance L1 together with appropriate resistor and capacitors not specifically identified by reference characters are shown for accomplishing this purpose. The control circuit may additionally include on-off switch S1 and a neon indicator light 39 for indicating when the blanket is turned on.

Referring now to the alternate embodiment of the invention as illustrated in FIG. 3, it is contemplated that the integrated solid state comfort control and overheat protection circuit of the present invention may also be utilized in blankets which employ a sensor wire having positive temperature coefficient resistance properties. The control circuit and blanket wiring are similar in most respects to that previously described in connection with FIG. 2, and to avoid repetitive description, elements in this embodiment which correspond to previously described elements will be identified by corresponding reference characters, with prime notation (') added.

Referring now more specifically to FIG. 3, it will be seen that the sensor wire 14' is comprised of a single conductor, and it is electrically connected in series with the gate of one of the switches (25') and the back of the other switch (26'). The PTC resistor 32' of the comfort control is also connected in series with the gate of the switch 25' and the back of the other switch 26'. The gate of the other switch 26' is connected to the back of switch 25' through a fixed resistance 35'.

At normal blanket temperatures, the PTC resistance sensor wire 14 is conductive, and allows the gate current to the semiconductor switches to flow normally. However, at overheat temperatures, the PTC sensor wire 14' increases in resistance and becomes insulative, cutting off the flow of gate current and thereby rendering the semiconductor switches 25, 26 nonconductive.

In the drawings and specification, there have been set forth preferred embodiments of the invention, and although specific terms are employed, they are used in a generic and descriptive sense only and not for purposes of limitation.

That which I claim is:
1. An electrical heating apparatus comprising:
a bedcover;
electrical heating means in said bedcover for generating heat upon flow of alternating electrical current therethrough; and control means associated with said electrical heating means and operable both (1) for regulating the temperature of said bedcover to a level set by the user and in response to changes in the ambient temperature and (2) for providing protection against an overheating condition in said bedcover, said control means comprising:

(a) a pair of gate controlled bidirectional semiconductor switches electrically connected to one another in series and in front-to-front orientation and also connected in series with said electrical heating means for controlling the passage of portions of both half cycles of an alternating electrical current so as to modulate the power delivered to said electrical heating means in response to a low current gating signal whose phase can be varied in relation to the alternating electrical current applied to said pair of semiconductor switches;

(b) means capacitively coupling the gates of said pair of semiconductor switches to each other;

(c) means electrically interconnecting the gate of each one of said semiconductor switches to the back of the other one of said semiconductor switches;

(d) positive temperature coefficient resistance means for sensing changes in ambient temperature above and below a predetermined temperature which is set by a user for comfort, said positive temperature coefficient resistance means being electrically connected by said means (c) in series with the gate of one of said semiconductor switches and the back of the other to allow phase control of said pair of semiconductor switches in response to changes in ambient temperature sensed by said positive temperature coefficient resistance means; and (e) temperature sensitive resistance means in said bedcover for sensing the occurrence of an overheating condition in the bedcover, said temperature sensitive resistance means being electrically connected with the gate of at least one of said pair of semiconductor switches for triggering the switches to a nonconductive state in response to a predetermined change in the resistance of said temperature sensitive resistance means in said bedcover resulting from the occurrence of an overheating condition so that the electrical current to said electrical heating means is interrupted.

2. The apparatus according to claim 1 wherein said temperature sensitive resistance means comprises a negative temperature coefficient resistance sensor wire in said bedcover.

3. The apparatus according to claim 1 wherein said temperature sensitive resistance means comprises a positive temperature coefficient resistance sensor wire in said bedcover.

4. An electrical heating apparatus comprising:
a bedcover;
electrical heating means in said bedcover for generating heat upon flow of alternating electrical current therethrough; and
control means associated with said electrical heating means and operable both (1) for regulating the temperature of said bedcover to a level set by the user and in response to changes in the ambient temperature and (2) for providing protection against an overheating condition in said bedcover, said control means comprising:

(a) a pair of gate controlled bidirectional semiconductor switches electrically connected to one another in series and in front-to-front orientation and also connected in series with said electrical heating means for controlling the passage of portions of both half cycles of an alternating electrical current so as to modulate the power delivered to said electrical heating means in response to a low current gating signal whose phase can be varied in relation to the alternating electrical current applied to said pair of semiconductor switches;

(b) means capacitively coupling the gates of said pair of semiconductor switches to each other;

(c) means electrically interconnecting the gate of each one of said semiconductor switches to the back of the other one of said semiconductor switches;

(d) positive temperature coefficient resistance means for sensing changes in ambient temperature above and below a predetermined temperature which is set by a user for comfort, said positive temperature coefficient resistance means being electrically connected by said means (c) in series with the gate of one of said semiconductor switches and the back of the other to allow phase control of said pair of semiconductor switches in response to changes in ambient temperature sensed by said positive temperature coefficient resistance means; and (e) a negative temperature coefficient resistance sensor wire in said bedcover for sensing the occurrence of an overheating condition in the bedcover, said negative temperature coefficient resistance sensor wire comprising a pair of conductors electrically spaced from one another by a negative temperature coefficient temperature sensitive dielectric material, each one of said pair of conductors being electrically connected by said means (c) in series with the gate of a respective one of said pair of semiconductor switches so that a predetermined reduction in the resistance of said negative temperature coefficient dielectric material in said bedcover resulting from the occurrence of an overheating condition will short out the gate signals to said semiconductor switches and thereby interrupt the alternating electrical current to said electrical heating means.

5. An electrical heating apparatus comprising:
a bedcover;
electrical heating means in said bedcover for generating heat upon flow of alternating electrical current therethrough; and
control means associated with said electrical heating means and operable both (1) for regulating the temperature of said bedcover to a level set by the user and in response to changes in the ambient temperature and (2) for providing protection against an overheating condition in said bedcover, said control means comprising:

(a) a pair of gate controlled bidirectional semiconductor switches electrically connected to one another in series and in front-to-front orientation and also connected in series with said electrical heating means for controlling the passage of portions of both half cycles of an alternating electrical current so as to modulate the power delivered to said electrical heating means in response to a low current gating signal whose phase can be varied in relation to the alternating electrical current applied to said pair of semiconductor switches;

(b) means capacitively coupling the gates of said pair of semiconductor switches to each other;

(c) means electrically interconnecting the gate of each one of said semiconductor switches to the back of the other one of said semiconductor switches;

(d) positive temperature coefficient resistance means for sensing changes in ambient temperature above and below a predetermined temperature which is set by a user for comfort, said positive temperature coefficient resistance means being electrically connected by said means (c) in series with the gate of one of said semiconductor switches and the back of the other to allow phase control of said pair of semiconductor switches in response to changes in ambient temperature sensed by said positive temperature coefficient resistance means; and (e) a positive temperature coefficient resistance sensor wire in said bedcover for sensing the occurrence of an overheating condition in the bedcover, said positive temperature coefficient resistance sensor wire being electrically connected by said means (c) in series with the gate of one of said pair of semiconductor switches so that a predetermined increase in the resistance of said sensor wire in said bedcover resulting from the occurrence of an overheating condition will interrupt the gate signal to said semiconductor switch and thereby interrupt the alternating electrical current to said electrical heating means.

* * * * *